US011847466B2

(12) United States Patent
Hoel et al.

(10) Patent No.: US 11,847,466 B2
(45) Date of Patent: Dec. 19, 2023

(54) CONTROLLED THERMAL SHUTDOWN AND RECOVERY

(71) Applicant: Texas Instruments Incorporated, Dallas, TX (US)

(72) Inventors: Robin Osa Hoel, Oslo (NO); Anand Kumar G, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 200 days.

(21) Appl. No.: 17/537,952

(22) Filed: Nov. 30, 2021

(65) Prior Publication Data

US 2023/0168900 A1    Jun. 1, 2023

(51) Int. Cl.
*G06F 9/4401*    (2018.01)

(52) U.S. Cl.
CPC .................... *G06F 9/4401* (2013.01)

(58) Field of Classification Search
None
See application file for complete search history.

(56) References Cited

U.S. PATENT DOCUMENTS

| 2008/0115010 | A1* | 5/2008 | Rothman | G06F 9/4856 714/10 |
| 2010/0023678 | A1* | 1/2010 | Nakanishi | G11C 16/102 327/512 |
| 2016/0147291 | A1* | 5/2016 | Thomas | G06F 1/324 713/320 |

* cited by examiner

Primary Examiner — Paul Yen
(74) Attorney, Agent, or Firm — Mandy Barsilai Fernandez; Frank D. Cimino

(57) ABSTRACT

In described examples, an integrated circuit (IC) includes a first temperature sensor, a processor, a second temperature sensor, and a reset module. The first sensor senses a first body temperature of the IC. The processor asserts a thermal shutdown signal if the first body temperature exceeds a first threshold. In response to the thermal shutdown signal, the second sensor asserts a reset request signal and senses a second body temperature of the IC. If the second body temperature is less than a second threshold, the second sensor asserts a reset end signal. The reset module outputs a system reset signal to the first sensor and the processor if the reset request signal is asserted, and outputs a system recovery signal if the reset end signal is asserted. The first sensor and the processor deactivate if the system reset signal is asserted, and activate if the system recovery signal is asserted.

20 Claims, 4 Drawing Sheets

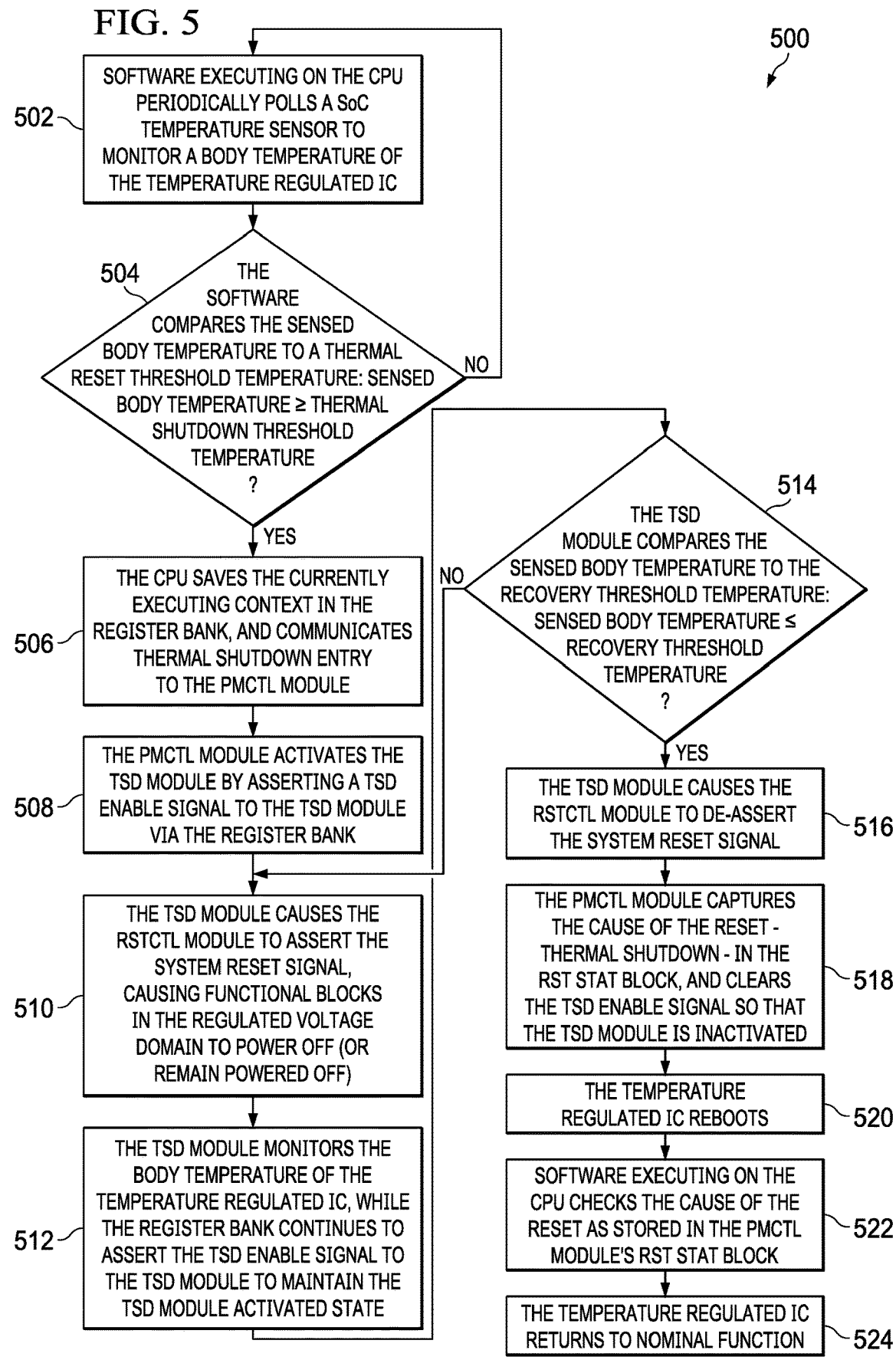

CONTROLLED THERMAL SHUTDOWN AND RECOVERY

TECHNICAL FIELD

This application relates generally to control of thermal shutdown and recovery, and more particularly to control of thermal shutdown and recovery implemented in hardware.

BACKGROUND

When an integrated circuit (IC) becomes too hot, IC functions can be shut down to lower temperature and avoid IC damage. When temperature has lowered sufficiently, the deactivated IC functions can be restarted so that the IC can return to normal operation. Example applications include in an automotive context, such as in a tire pressure monitoring system, and in an industrial context, such as in process control in factories.

SUMMARY

In described examples, an integrated circuit (IC) includes a first temperature sensor, a processor, a second temperature sensor, and a reset module. The first sensor senses a first body temperature of the IC. The processor asserts a thermal shutdown signal if the first body temperature exceeds a first threshold. In response to the thermal shutdown signal, the second sensor asserts a reset request signal and senses a second body temperature of the IC. If the second body temperature is less than a second threshold, the second sensor asserts a reset end signal. The reset module outputs a system reset signal to the first sensor and the processor if the reset request signal is asserted, and outputs a system recovery signal if the reset end signal is asserted. The first sensor and the processor deactivate if the system reset signal is asserted, and activate if the system recovery signal is asserted.

BRIEF DESCRIPTION OF THE DRAWINGS

FIG. 5 shows an example process for operating the temperature regulated IC of FIG. 1.

DETAILED DESCRIPTION

Figure 1:
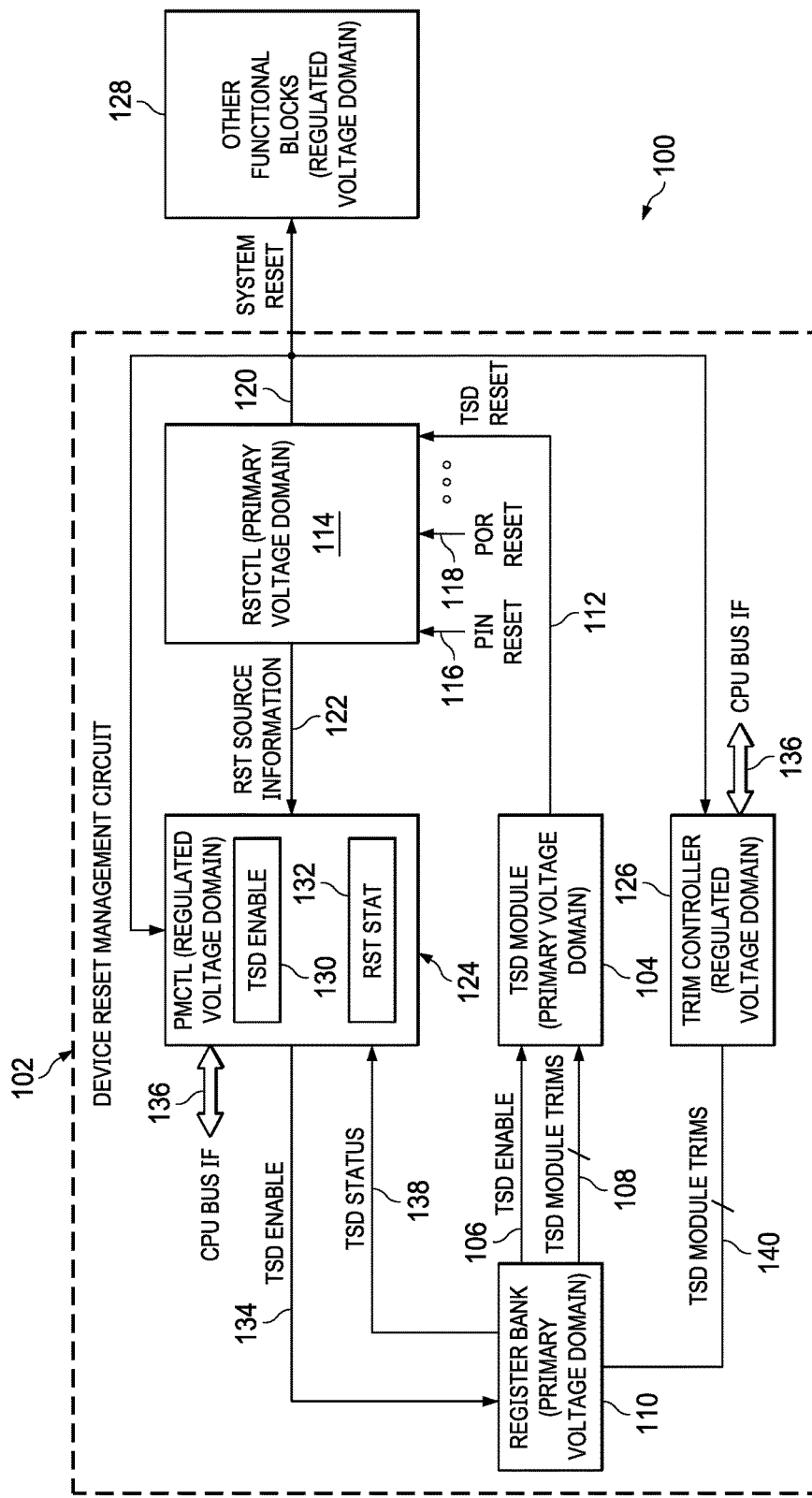
FIG. 1 shows an example functional block diagram of a temperature regulated IC.

FIG. 1 shows an example functional block diagram of a temperature regulated IC 100. The temperature regulated IC 100 includes a device reset management circuit 102. A thermal shutdown (TSD) module 104 has a TSD enable input and a TSD trim input. The TSD enable input is connected to a TSD enable output 106 of a register bank 110, and the TSD trim input is connected to a TSD trim output 108 of the register bank 110. The TSD module 104 also has a TSD output 112, through which the TSD module 104 outputs a TSD reset request signal to a reset control (RSTCTL) module 114.

Generally, the RSTCTL module 114 receives multiple inputs, any of which can trigger a system reset, and the RSTCTL module then responds by communicating signals to various blocks. Specifically, the RSTCTL module 114 has multiple reset signal inputs, such as a TSD reset input (connected to the TSD module 104 via the TSD output 112), a pin reset input 116, and a power-on reset (POR) input 118. The RSTCTL module's 114 reset signal inputs 116 and 118 (and the TSD reset input) are connected to receive reset signals from various sources, some of which are not shown. When the RSTCTL module 114 receives a reset request signal, triggering a system reset, the RSTCTL module 114 asserts a system reset signal through a system reset output 120, and outputs information identifying the source of the reset signal (such as a pin or a power-on event) through a RST source information output 122. (In some examples, the RST source information output 122 can also be used to identify a reset signal originating in a thermal shutdown event.) The system reset output 120 is connected to a power management control (PMCTL) module 124, a trim controller 126, and to other functional blocks 128—such as a central processing unit (CPU) 216 (further described with respect to FIG. 2)—of the temperature regulated IC 100. The RST source information output 122 is connected to an RST source information input of the PMCTL module 124.

In an example embodiment, different blocks of the TSD device reset management circuit 102 belong to one of two different voltage domains. The TSD module 104, the register bank 110, and the RSTCTL module 114 are included within a primary voltage domain of the temperature regulated IC 100. The primary voltage domain receives power from a main power source of the temperature regulated IC 100, such as an external battery (for example, a car battery) or a power bus. The remaining functional blocks of the temperature regulated IC 100 are included within a regulated voltage domain of the temperature regulated IC 100. The regulated voltage domain receives power from a voltage regulator circuit (not shown) that is a part of the temperature regulated IC 100, and may be independent from the primary voltage domain such that the regulated voltage domain may transition between a low-power mode and a high-power mode independent of the primary voltage domain.

The PMCTL module 124 includes a TSD enable block 130 and a reset status (RST STAT) block 132. The PMCTL module 124 outputs a TSD enable signal from a PMCTL TSD enable output 134, which is connected to a TSD enable input of the register bank 110. The PMCTL module 124 is connected to a CPU bus interface (CPU bus IF) 136, through which the PMCTL module 124 communicates with the CPU 216 (see FIG. 2).

The register bank 110 includes a TSD status output 138, and outputs a TSD status signal via the TSD status output 138 to a TSD status input of the PMCTL module 124. As described above, the register bank 110 also includes a TSD enable output 106 and a TSD trim output 108 connected to respective inputs of the TSD module 104. The TSD trim output 108 is multiple bits wide to accommodate multiple trims used by different functional blocks in the TSD module 104 (further described with respect to FIG. 3). The register bank 110 further includes a TSD trim input connected to a TSD trim output 140 of the trim controller 126. The TSD trim output 140 is multiple bits wide to accommodate multiple trim functionality of the TSD module 104. As described above, the trim controller 126 is connected to the system reset output 120 of the RSTCTL module 114 to receive the system reset signal. The trim controller 126 is also connected to the CPU bus IF 136 to communicate with the CPU 216.

The trim controller 126 stores TSD module trims. The TSD module trims are values used to correct TSD module 104 behavior for process, voltage, and temperature (PVT) variation. The TSD module 104 trims are determined during production test and are stored in a memory (not shown), such as a flash memory. During a booting process of the temperature regulated IC 100, the CPU 216 copies the TSD module 104 trims from the memory to the trim controller 126. The TSD module 104 trims are then outputted from the trim controller 126 to the register bank 110 via the trim controller TSD trim output 140. The register bank 110 continuously outputs the TSD module trims to the TSD module 104 via the register bank TSD trim output 108, including during thermal shutdown. When the temperature regulated IC 100 recovers from a thermal shutdown state, the CPU 216 reboots and the trims load-in process (from memory, to trim controller 126, to register bank 110) repeats.

Figure 2:
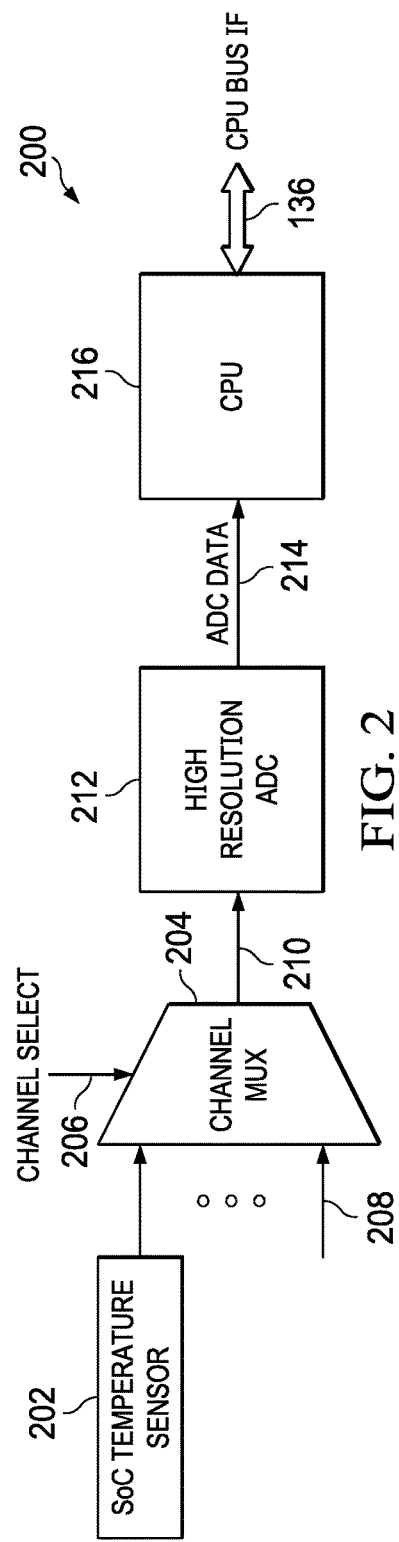
FIG. 2 shows a functional block diagram of an example temperature sensing system for use in the temperature regulated IC of FIG. 1.

FIG. 2 shows a functional block diagram of an example temperature sensing system 200 for use in the temperature regulated IC 100 of FIG. 1. An integrated temperature sensor 202 (e.g., integrated into a system on chip (SoC) or other integrated circuit that includes temperature regulated IC 100) senses a temperature, such as a silicon junction temperature, which indicates a body temperature of the temperature regulated IC 100. The integrated temperature sensor 202 can be, for example, a temperature diode. One or more integrated temperature sensor(s) 202 output their respective temperature information to a respective input of a channel multiplexer (mux) 204. Depending on a channel select input 206 of the channel mux 204, the channel mux 204 outputs the SoC temperature sensor 202 information or data received on another input line 208 of the channel mux 204. The channel select input 206 is determined by the CPU 216 based on, for example, user application code. For example, the CPU 216 can assert the channel select input 206 to periodically select, and thereby poll, the various SoC temperature sensor(s) 202 respective outputs to determine a respective current body temperature of the temperature regulated IC 100. A channel mux output 210 is connected to a high resolution analog to digital converter (ADC) 212. An ADC output 214 of the high resolution ADC 212 is connected to output ADC data along an output 214 to the CPU 216. The SoC temperature sensor(s) 202, the channel mux 204, the high resolution ADC 212, and the CPU 216 are included in the regulated voltage domain of the temperature regulated IC 100.

The operation of the FIG. 2 CPU 216 in combination with FIG. 1 blocks of the temperature regulated IC 100 is now described. In a first mode of operation, the CPU 216 compares ADC data corresponding to temperature data from the SoC temperature sensor 202 to a thermal reset threshold value. The thermal reset threshold value indicates, for example, a maximum safe operating temperature—a thermal reset threshold temperature—of the temperature regulated IC 100. When the CPU 216 determines that the temperature sensed by the SoC temperature sensor 202 exceeds the thermal reset threshold temperature, the CPU 216 programs the TSD enable block 130 of the PMCTL module 124, via the CPU bus IF 136, to toggle a TSD state bit from /ENABLE to ENABLE (for example, from a low voltage corresponding to a logical zero to a high voltage corresponding to a logical one). This triggers thermal shutdown of selected portions of the temperature regulated IC 100. The CPU 216 also saves a currently executing context in the register bank 110.

In response to the TSD state bit being toggled to ENABLE, the PMCTL module 124 outputs an asserted TSD enable signal 402 (see FIG. 4) to the register bank 110 via the PMCTL TSD enable output 134. In some embodiments, the CPU 216 stores the context in registers in the PMCTL module 124, and the PMCTL module 124 forwards the context to the register bank 110 for storage during shutdown (PMCTL module 124 context storage registers and corresponding PMCTL module 124 to register bank 110 connection are not shown).

In response to the TSD enable signal, the register bank 110 stores the ENABLE value of the TSD state bit. It then outputs the TSD enable signal 402 to the TSD module 104, via the TSD enable output 106. The register bank 110 also outputs the TSD enable signal 402 to the PMCTL module 124 via the TSD status output 138. The register bank 110 may continue to output the TSD module 104 trims and the TSD enable signal 402 to the TSD module 104 during thermal shutdown. During this time, the register bank 110, which is within the primary voltage domain, is active; while the trim controller 126, which receives the system reset signal and is within the regulated voltage domain, is powered off or otherwise enters a low-power mode (e.g., a reset mode). In some examples the entire regulated voltage domain enters the low-power mode.

The TSD module 104 activates in response to receiving the asserted TSD enable signal 402 from the register bank 110, and the activated TSD module 104 sends a TSD reset request signal to the RSTCTL module 114 via the TSD output 112. Function of the TSD module 104 is further described with respect to FIG. 3, along with a thermal shutdown recovery process of the temperature regulated IC 100.

In response to the TSD reset request signal, the RSTCTL module 114 outputs, via the system reset output 120, an asserted system reset signal to various other functional blocks in the regulated voltage domain, including the PMCTL module 124, the trim controller 126, and other functional blocks 128 of the temperature regulated IC 100, such as the CPU 216. When the system reset signal is activated, it causes these functional blocks in the regulated voltage domain to power off or otherwise enter the low-power mode.

In an example embodiment, functional blocks in the primary voltage domain do not enter a corresponding low-power or reset mode. The TSD module 104, the register bank 110, and the RSTCTL module 114 are used by a thermal shutdown recovery process, and accordingly, are not deactivated during thermal shutdown. Thermal shutdown can be communicated via the register bank 110 to, for example (depending on application), a dashboard display of a vehicle (for example, with a warning to lower speed), a display monitor for a factory tool, or a host chip of a circuit that is entering thermal shutdown.

Figure 3:
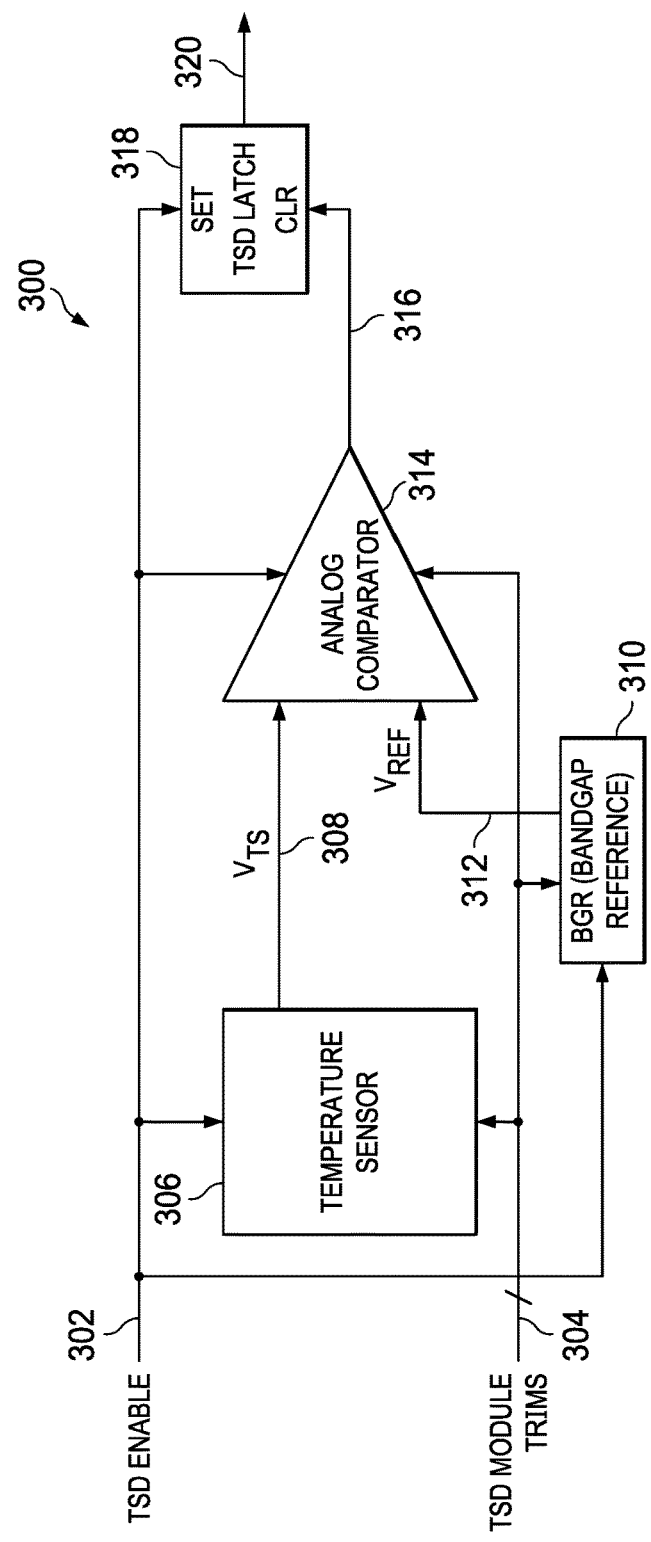
FIG. 3 shows a functional block diagram of an example thermal shutdown (TSD) module, for use as the TSD module in the temperature regulated IC of FIG. 1.

FIG. 3 shows a functional block diagram of an example TSD module 300, for use as the TSD module 104 in the temperature regulated IC of FIG. 1. A TSD enable input 302 receives a TSD enable signal responsive to the state of the TSD state bit. A TSD trims input 304 receives the TSD module trims initially provided by the trim controller 126 and then through the register bank 110. The TSD module 300 may include one or more temperature sensors 306, which may be distinct from the FIG. 2 SoC temperature sensor 202 of the temperature sensing system 200. While activated, the temperature sensor 306 detects a temperature (e.g., a silicon junction temperature) of the temperature regulated IC 100. The temperature sensor 306 has a sensor enable input connected to the TSD enable input 302 so that the temperature sensor 306 is enabled during the thermal shutdown, and a sensor trim input connected to the TSD trims input 304. The temperature sensor 306 also has a temperature sensor output 308, along which it outputs a voltage $V_{TS}$ corresponding to a sensed temperature.

A bandgap voltage reference (BGR) 310 has a BGR enable input connected to the TSD enable input 302, and a BGR trim input connected to the TSD trims input 304. The BGR 310 has a BGR output 312, along which it outputs a reference voltage $V_{REF}$. $V_{REF}$ corresponds to a recovery threshold voltage, corresponding to a recovery threshold temperature that the TSD module 300 detects and from which it provides signaling to permit the temperature regulated IC 100 to resume (recover) its normal operations.

A first input of an analog comparator 314 is connected to the temperature sensor output 308, from which it receives $V_{TS}$. A second input of the analog comparator 314 is connected to the BGR output 312, from which it receives $V_{REF}$. A comparator enable input of the analog comparator 314 is connected to the TSD enable input 302. A comparator trim input of the analog comparator 314 is connected to the TSD trims input 304. The analog comparator 314 has a comparator output 316. The analog comparator 314 outputs a voltage corresponding to a first logical value (for example, a logical one) if $V_{TS} > V_{REF}$ (indicating the sensed temperature is higher than a threshold value), and outputs a voltage corresponding to a second logical value (for example, a logical zero) if $V_{TS} < V_{REF}$ (indicating the sensed temperature is lower than the threshold value). Accordingly, the analog comparator 314 outputs a first logical value if the temperature sensor 306 detects a temperature that is greater than the recovery threshold temperature represented by $V_{REF}$, and outputs the second logical value if the temperature sensor 306 detects a temperature that is less than the recovery threshold temperature.

A TSD latch 318 has a SET input and a CLR (clear) input. The SET input of the TSD latch 318 is connected to the TSD enable input 302. The CLR input of the TSD latch 318 is connected to the comparator output 316. The TSD latch 318 has a TSD latch output 320 corresponding to the TSD output 112. The TSD latch 318 is set (latched) to a logical one, and outputs a TSD reset request signal, if the TSD enable signal is asserted. The TSD reset request signal is received by the RSTCTL module 114 and causes the RSTCTL module 114 to assert the system reset signal at the system reset output 120. If the analog comparator 314 outputs the logical value corresponding to the temperature sensed by the temperature sensor 306 being lower than the recovery threshold voltage, the TSD latch 318 is cleared, and stops outputting the TSD reset request signal. Accordingly, the clear action caused by the signal received by the CLR input being asserted to an activation value takes priority over the set (latch) action caused by the SET input being asserted to an activation value.

In operation, the TSD module 300 determines when the temperature of the temperature regulated IC 100 falls below the recovery threshold temperature, and in response to satisfying this condition, causes the functional blocks of the temperature regulated IC 100 in the regulated voltage domain to resume operation (recover from thermal shutdown) by exiting the low power mode. Specifically, the TSD enable signal, received by the TSD module 300 via the TSD enable input 302, causes the temperature sensor 306, the BGR 310, and the analog comparator 314 to begin operation. Each of these blocks then operates as described above, whereby the state of the TSD latch 318 may be set in response to the TSD enable signal, and then cleared in response to a circuit temperature that corresponds to $V_{TS}$ falling below the recovery threshold temperature represented by $V_{REF}$.

As described above, in response to the analog comparator 314 determining that the temperature sensed by the temperature sensor 306 is lower than the recovery temperature ($V_{TS} < V_{REF}$), the analog comparator 314 outputs a logical value that causes the TSD latch 318 to clear. The TSD latch 318 clearing causes the TSD latch 318 to cease outputting the TSD reset request signal. After the RSTCTL module 114 stops receiving the TSD reset request signal, the RSTCTL module 114 stops asserting the system reset signal. In response to the system reset signal being de-asserted, functional blocks in the regulated voltage domain are returned to a powered-on state and the CPU 216 begins to reboot. The CPU 216 rebooting can include the CPU 216 reloading the context that was saved to the register bank 110 during entry into the low power mode.

The PMCTL module 124, in response the system reset signal being de-asserted, reactivates. On reactivation, the PMCTL module 124 captures the ENABLE value of the TSD state bit in the RST STAT block 132 in response to the TSD enable signal received from the register bank 110 (via the TSD status output 138), and causes the TSD enable block 130 to flip the value of the TSD state bit from ENABLE to /ENABLE (corresponding to switching off a signal enabling the TSD module 104). Capturing an indication in the RST STAT block 132 that the shutdown was a thermal shutdown makes this information available to, for example, the temperature regulated IC 100, a host device, or to a user (such as for operation or maintenance purposes).

After capturing the shutdown cause information, the PMCTL module 124 signals the register bank 110 to clear the TSD status bit, which causes the register bank 110 to de-assert the TSD enable signal. (In some embodiments, the PMCTL TSD enable output 134 includes a SET line and a CLR line; the SET line is used to set the value of the TSD status bit in the register bank 110 to ENABLE, and the CLR line is used to set the value of the TSD status bit in the register bank 110 to /ENABLE.) This causes the FIG. 3 temperature sensor 306, the BGR 310, and the analog comparator 314 to cease operating.

In the temperature regulated IC 100, thermal shutdown can be referred to as being software managed. Thermal shutdown is ultimately initiated by the CPU 216 determining, in a software process that it executes, that the temperature sensed by the SoC temperature sensor 202 exceeds the thermal reset threshold. Recovery from thermal shutdown, in contrast, can be referred to as being hardware managed. Recovery is ultimately initiated by the analog comparator 314 determining, in hardware, that the temperature sensed by the temperature sensor 306 is lower than the recovery threshold temperature.

If the SoC temperature sensor 202 and the high resolution ADC 212 are high resolution devices, high resolution temperature measurement is enabled. Increased accuracy allows the process executing on the CPU 216, to wait to trigger the reset only when the temperature is close to a designed maximum operating temperature of the temperature regulated IC 100. This allows the temperature regulated IC 100 to have increased operating time, and to avoid shutdowns at temperatures below the designed maximum that would cause lower resolution measurement to trigger shutdown.

In some embodiments, the TSD module's 104 temperature sensor 306 (see FIG. 3) can be relatively lower resolution, enabling a lower IC area cost. Designing the TSD modules's 104 temperature sensor 306 to be lower resolution enables use of trims addressing a single voltage and temperature pair, rather than using multiple trims to address variation in voltage and temperature. This saves production test cost in addition to saving area cost.

For example, the SoC temperature sensor 202 can have two degrees Celsius (C) resolution, with a thermal reset threshold temperature of 123 degrees C., enabling shutdown between 121 and 125 degrees C. The TSD module's 104 temperature sensor 306 can have a recovery threshold temperature of 95 degrees C., with inaccuracy of the temperature sensor 306 enabling thermal shutdown recovery between 95 and 110 degrees C.

Figure 4:
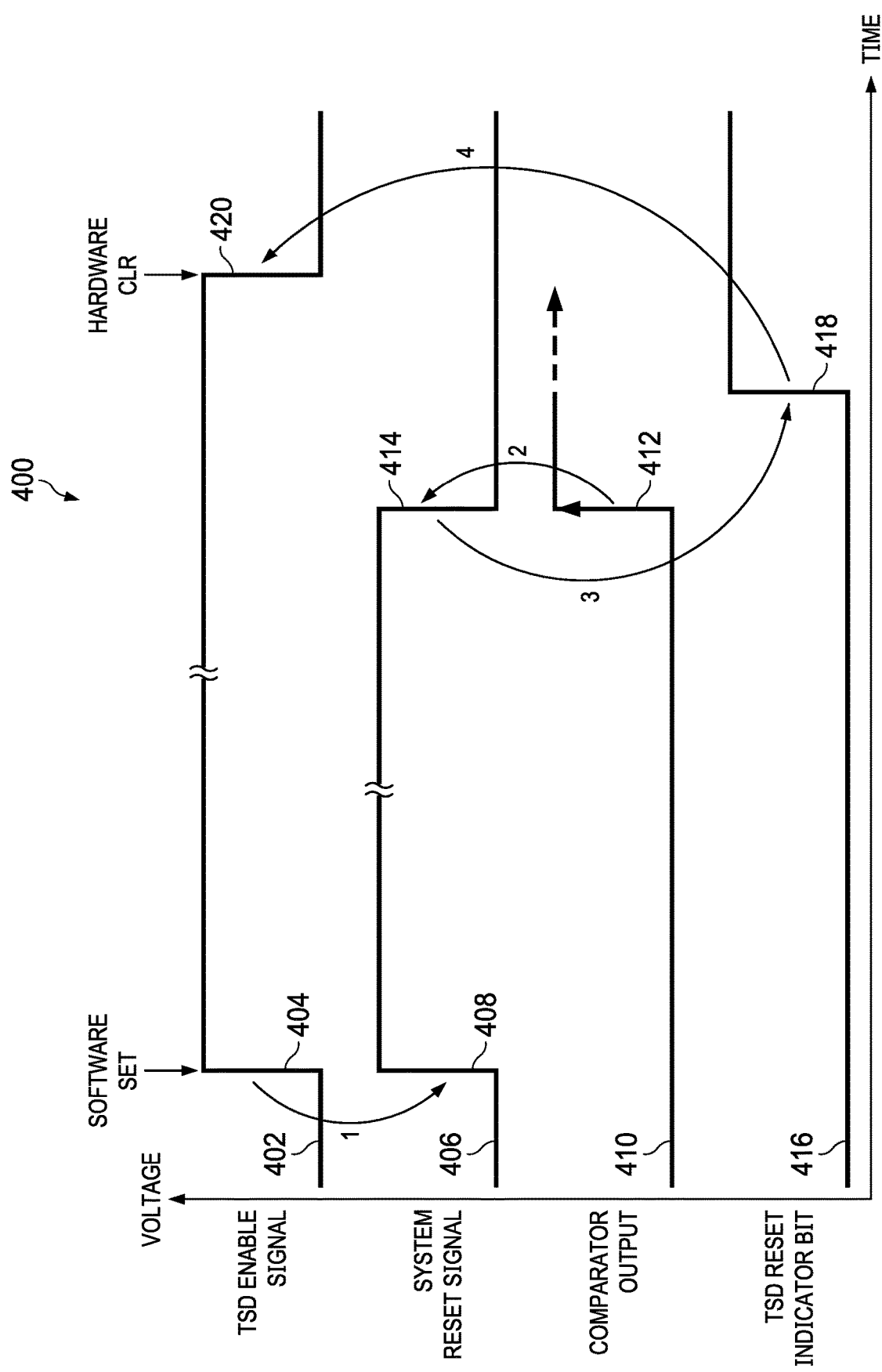
FIG. 4 shows an example signal timing diagram corresponding to the TSD module of FIG. 3 and the temperature regulated IC of FIG. 1.

FIG. 4 shows an example signal timing diagram corresponding to the TSD module 300 of FIG. 3 and the temperature regulated IC 100 of FIG. 1. Causation and ordering are indicated by numbered arrows. Initially, a TSD enable signal 402, is de-asserted and has a low voltage, corresponding to a logical zero. When software executed by the CPU 216 determines that the temperature of the temperature regulated IC 100 sensed by the SoC temperature sensor 202 is above the thermal reset threshold temperature, the software signals the PMCTL module 104 to set the TSD state bit to an asserted value of ENABLE. This sets the TSD enable signal 402 to a high voltage, corresponding to logical one, at rising edge 404.

The TSD enable signal 402 corresponding to a logical one causes the TSD module 300 to activate and the TSD latch 318 to set. After the TSD latch 318 is set, the TSD latch 318 asserts the TSD reset request signal to the RSTCTL module 114. In response to the asserted TSD reset request signal, the RSTCTL module 114 toggles the system reset signal 406 (at the system reset output 120 of FIG. 1) from a low voltage, corresponding to a logical zero, to a high voltage, corresponding to a logical one, at rising edge 408. Accordingly, the CPU 216 setting the TSD enable 402 to logical one ultimately causes the RSTCTL module 114 to set the system reset signal 406 to logical one (numbered arrow 1). The system reset signal being set to logical one causes the regulated voltage domain to enter a reset mode.

When the activated TSD module 104 determines that the temperature of the temperature regulated IC 100 has fallen below the recovery threshold temperature, the comparator output 410 sends a clear signal 412 starting at rising edge 414. The clear signal 412 causes the TSD latch 318 to clear and to stop asserting the TSD reset request signal to the RSTCTL module 114. This causes the RSTCTL module 114 to toggle the system reset signal 406 to a low voltage (logical zero), at falling edge 414. Accordingly, the comparator output 410 asserting the clear signal 412 ultimately causes the RSTCTL module 114 to cease asserting the system reset signal 406 to functional blocks in the regulated voltage domain (numbered arrow 2).

The system reset signal 406 toggling low at falling edge 414 causes the PMCTL module 124 to set a TSD reset indicator 416 in the RST STAT block 132 (numbered arrow 3), indicating that the reset was caused by a thermal shutdown, from a low voltage (corresponding to a logical zero) to a high voltage (corresponding to a logical one), at rising edge 418. The PMCTL module 124 then—in a hardware-mediated action—clears the TSD state bit, toggling it from ENABLE to /ENABLE, which causes the TSD enable signal to go from a high voltage (logical one) to a low voltage (logical zero) at falling edge 420 (numbered arrow 4). This deactivates the TSD module 104 (and 300).

FIG. 5 shows an example process 500 for operating the temperature regulated IC 100 of FIG. 1. In step 502, software stored on a computer readable medium (for example, internal or external storage) and executing on the CPU 216 periodically polls a SoC temperature sensor 202 to monitor a body temperature of the temperature regulated IC 100. In step 504, the software compares the sensed body temperature to a thermal reset threshold temperature to determine whether the thermal shutdown threshold temperature has been reached. If not, the temperature regulated IC 100 continues normal operation, including performing steps 502 and 504 in a loop. If the thermal shutdown threshold temperature is determined to have been reached, the process continues to step 506.

In step 506, the CPU 216 saves the currently executing context in the register bank 110 and communicates thermal shutdown entry to the PMCTL module 124. In step 508, the PMCTL module 124 activates the TSD module 104 by asserting a TSD enable signal to the TSD module 104 via the register bank 110. In step 510, the TSD module 104 causes the RSTCTL module 114 to assert the system reset signal, causing functional blocks in the regulated voltage domain to power off. In step 512, the TSD module 104 monitors the body temperature of the temperature regulated IC 100, while the register bank 110 continues to assert the TSD enable signal to the TSD module 104 to maintain the TSD module's 104 activated state. In step 514, the TSD module 104 compares the sensed body temperature to the recovery threshold temperature to determine whether the body temperature has reduced to or below the recovery threshold temperature. If not, the temperature regulated IC 100 remains in the thermal shutdown-induced reset state in a process loop including steps 510, 512, and 514. If the recovery threshold temperature is determined to have been reached, the process proceeds to step 516.

In step 516, the TSD module 104 causes the RSTCTL module 114 to de-assert the system reset signal. In step 518, in response to the de-asserted system reset signal and to a signal from the register bank 110, the PMCTL module 124 captures the cause of the reset—thermal shutdown—in the RST STAT block 132, and clears the TSD enable signal so that the TSD module 104 is inactivated. In step 520, in response to the de-asserted system reset signal, the temperature regulated IC 100 reboots. In step 522, software executing on the reactivated CPU 216 checks the cause of the reset, as stored in the PMCTL module's 124 RST STAT block 132. In step 524, the temperature regulated IC 100 returns to nominal function. This may include reloading the context stored in register bank 110 during step 506. Steps 502-508, 522, and 524 are software-mediated, and steps 510-520 are hardware-mediated.

Modifications are possible in the described embodiments, and other embodiments are possible, within the scope of the claims.

In some embodiments, the RSTCTL module 114 outputs a recovery signal to cause functional blocks in the regulated voltage domain to recover from the reset mode.

In some embodiments, the RSTCTL module 114 ceasing to send the system reset signal is equivalent to the RSTCTL module 114 sending a system recovery signal.

In some embodiments, the TSD module 104 ceasing to send the TSD reset request signal is equivalent to the TSD module 104 sending a reset end signal.

In some embodiments, an error range of a temperature sensed by the SoC temperature sensor 202 that can correspond to a thermal shutdown threshold temperature does not overlap with an error range of a temperature sensed by the TSD module's 300 temperature sensor 306 that can correspond to a recovery threshold temperature. This helps to enable intended hysteresis.

In some embodiments, the PMCTL module's 124 RST STAT 132 block captures reset source information output by the RSTCTL module 114 via the RST source information output 122, except when the reset source is thermal shutdown.

What is claimed is:

1. An integrated circuit, comprising:
   a first temperature sensor configured to sense a body temperature of the integrated circuit to generate a first sensed temperature;
   a processor configured to assert a thermal shutdown signal in response to the first sensed temperature exceeding a first threshold temperature;
   a second temperature sensor configured to, in response to assertion of the thermal shutdown signal, assert a reset request signal and sense the body temperature of the integrated circuit to generate a second sensed temperature, and in response to the second sensed temperature being less than a second threshold temperature, assert a reset end signal; and
   a reset module configured to output a system reset signal to the first temperature sensor and the processor in response to assertion of the reset request signal, and to output a system recovery signal in response to assertion of the reset end signal;
   wherein the first temperature sensor and the processor are configured to deactivate in response to assertion of the system reset signal, and to reactivate in response to assertion of the system recovery signal.

2. The integrated circuit of claim 1, wherein the first temperature sensor is a higher resolution temperature sensor than the second temperature sensor.

3. The integrated circuit of claim 1, wherein the first threshold temperature is higher than the second threshold temperature.

4. The integrated circuit of claim 1, wherein the second temperature sensor includes:
   a temperature sensing module including a sense enable input and a sense output, the sense enable input coupled to receive the thermal shutdown signal, the temperature sensing module configured to sense the body temperature and to output a voltage corresponding to the sensed body temperature;
   a bandgap reference including a reference enable input and a reference output, the reference enable input coupled to receive the thermal shutdown signal, the bandgap reference configured to output a bandgap reference voltage;
   an analog comparator including a sense input, a reference input, and a comparator output, the sense input coupled to the sense output and the reference input coupled to the reference output, the analog comparator configured to compare the sense input to the reference input and to generate an output in response to the comparison indicating whether the body temperature has fallen below the second threshold temperature; and
   a latch including a SET input, a CLR input, and a latch output, the SET input coupled to receive the thermal shutdown signal, the CLR input coupled to the comparator output;
   the latch configured to, in response to the thermal shutdown signal, cause the reset module to output the system reset signal; and
   the latch configured to, in response to the comparator output indicating that the body temperature has fallen below the second threshold temperature, cause the reset module to output the system recovery signal.

5. The integrated circuit of claim 1, further including a register bank configured to assert the thermal shutdown signal to the second temperature sensor after the processor deactivates, and to de-assert the thermal shutdown signal in response to assertion of the system recovery signal.

6. The integrated circuit of claim 5, wherein the second temperature sensor is configured to cease sensing the body temperature in response to the register bank de-asserting the thermal shutdown signal.

7. The integrated circuit of claim 5, further including a power management control module configured to cause the register bank to de-assert the thermal shutdown signal after the reset module asserts the system recovery signal.

8. The integrated circuit of claim 7,
   wherein the first temperature sensor, the processor, and the power management control module are included in a first voltage domain;
   wherein the reset module, the second temperature sensor, and the register bank are included in a second voltage domain; and
   wherein the first voltage domain is powered down after the reset module asserts the system reset signal, and the second voltage domain remains active after the reset module asserts the system reset signal.

9. The integrated circuit of claim 7,
   wherein the processor outputting the thermal shutdown signal is software-mediated; and
   wherein the power management control module causing the register bank to de-assert the thermal shutdown signal is hardware-mediated.

10. The integrated circuit of claim 7,
    wherein the register bank asserts the thermal shutdown signal to the power management control module; and
    wherein the power management control module is configured to, in response to assertion of the system recovery signal and to receiving assertion of the thermal shutdown signal from the register bank, store an indicator that the system reset signal corresponded to a thermal shutdown.

11. The integrated circuit of claim 7,
    further including:
    a memory storing trims configured to improve temperature measurement and comparison accuracy of the second temperature sensor; and
    a trim controller;
    wherein, after the processor reactivates, the processor causes the memory to output the trims to the trim controller;
    wherein the trim controller outputs the trims to the register bank;
    wherein the register bank stores the trims; and
    wherein the register bank continuously outputs the trims to the second temperature sensor.

12. A method comprising:
    sensing a first body temperature of an integrated circuit, using a first temperature sensor, to generate a first sensed temperature;
    asserting a thermal shutdown signal, using a processor, in response to the first sensed temperature exceeding a first threshold temperature;

in response to assertion of the thermal shutdown signal, using a second temperature sensor for:
- asserting a reset request signal;
- sensing a second body temperature of the integrated circuit to generate a second sensed temperature; and
- asserting a reset end signal, and de-asserting the reset request signal, in response to the second sensed temperature being less than a second threshold temperature;

asserting a system reset signal, using a reset controller, in response to assertion of the reset request signal;

deactivating the first temperature sensor and the processor in response to assertion of the system reset signal;

asserting a system recovery signal, using the reset controller, in response to assertion of the reset end signal; and reactivating the first temperature sensor and the processor in response to assertion of the system recovery signal.

13. The method of claim 12, wherein the sensing the first body temperature is performed at a higher resolution than the sensing the second body temperature.

14. The method of claim 12, wherein the first threshold temperature is higher than the second threshold temperature.

15. The method of claim 12,
wherein assertion of the thermal shutdown signal causes a latch to set and to output an asserted reset request signal; and
wherein the second temperature sensor determining that the second sensed temperature is less than the second threshold temperature causes the latch to clear and to output an asserted reset end signal.

16. The method of claim 12, further including:
asserting the thermal shutdown signal to the second temperature sensor, using a register bank, after the processor deactivates; and
de-asserting the thermal shutdown signal, using the register bank, in response to assertion of the system recovery signal.

17. The method of claim 16, further including ceasing sensing the second body temperature in response to the register bank de-asserting the thermal shutdown signal.

18. The method of claim 16, further including:
asserting the thermal shutdown signal, using the register bank, to a power management control module; and
storing an indicator that the system reset signal corresponded to a thermal shutdown, using the power management control module, in response to assertion of the system recovery signal and to receiving assertion of the thermal shutdown signal from the register bank.

19. The method of claim 18,
powering the first temperature sensor, the processor, and the power management control module in a first voltage domain;
powering the reset controller, the second temperature sensor, and the register bank in a second voltage domain; and
after the reset controller asserts the system reset signal, powering down the first voltage domain while continuing to power the second voltage domain.

20. The method of claim 18,
wherein the processor asserting the thermal shutdown signal is software-mediated; and
wherein the power management control module causing the register bank to de-assert the thermal shutdown signal is hardware-mediated.

* * * * *